US007388168B2

(12) United States Patent
Chamblee et al.

(10) Patent No.: US 7,388,168 B2
(45) Date of Patent: Jun. 17, 2008

(54) MAIL PROCESSING SYSTEM AND METHOD

(75) Inventors: Jennifer Chamblee, Columbus, GA (US); John Mottola, Plainsboro, NJ (US); Kwun Ng, College Point, NY (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/460,553

(22) Filed: Jul. 27, 2006

(65) Prior Publication Data

US 2006/0260989 A1 Nov. 23, 2006

Related U.S. Application Data

(62) Division of application No. 10/673,061, filed on Sep. 26, 2003, now Pat. No. 7,329,824.

(51) Int. Cl.
*B07C 5/00* (2006.01)
*G06K 9/00* (2006.01)

(52) U.S. Cl. ....................... 209/584; 209/900; 705/410

(58) Field of Classification Search ................ 209/584, 209/900; 705/401, 402, 404, 410
See application file for complete search history.

(56) References Cited

U.S. PATENT DOCUMENTS

| | | | | |
|---|---|---|---|---|
| 5,470,427 | A | 11/1995 | Mikel et al. | |
| 5,475,603 | A | 12/1995 | Korowotny | |
| 5,960,963 | A | 10/1999 | Chodack et al. | |
| 6,219,994 | B1 * | 4/2001 | Taniguchi | 53/147 |
| 6,332,098 | B2 * | 12/2001 | Ross et al. | 700/226 |
| 6,561,339 | B1 | 5/2003 | Olson et al. | |
| 6,575,358 | B2 | 6/2003 | O'Callaghan et al. | |
| 6,701,216 | B2 | 3/2004 | Miller et al. | |
| 6,738,689 | B2 | 5/2004 | Sansone | |
| 6,747,560 | B2 * | 6/2004 | Stevens, III | 340/572.4 |
| 6,801,833 | B2 | 10/2004 | Pintsov | |
| 6,816,075 | B2 * | 11/2004 | Grunes et al. | 340/572.1 |
| 6,911,910 | B2 | 6/2005 | Sansone et al. | |
| 6,943,312 | B2 | 9/2005 | Zimmermann | |
| 7,118,034 | B2 * | 10/2006 | Baldassari et al. | 235/383 |
| 2003/0163421 | A1 * | 8/2003 | Van Ness et al. | 705/40 |
| 2004/0049316 | A1 | 3/2004 | Pintsov et al. | |
| 2004/0117326 | A1 * | 6/2004 | Amato | 705/401 |
| 2005/0004702 | A1 | 1/2005 | McDonald | |
| 2005/0071287 | A1 | 3/2005 | Chamblee et al. | |
| 2006/0016737 | A1 * | 1/2006 | Carlson | 209/584 |

* cited by examiner

*Primary Examiner*—Patrick H. Mackey
*Assistant Examiner*—Mark Hageman
(74) *Attorney, Agent, or Firm*—Townsend and Townsend and Crew LLP

(57) ABSTRACT

A mail processing system includes a plurality of trays that are each adapted to hold a plurality of mail items. The mail items in a tray are directed to a common recipient. The system also includes a plurality of mail processing machines that are adapted to process the mail items. The different mail items may take different processing paths through the plurality of mail processing machines. The system also includes a tray tag generator that is configured to produce tray tags. Each of the plurality of trays is associated with a tray tag and each tray tag includes recipient information identifying processing requirements relating to the recipient of the mail items in the tray associated with the tray tag.

4 Claims, 5 Drawing Sheets

MAIL PROCESSING SYSTEM AND METHOD

CROSS-REFERENCES TO RELATED APPLICATIONS

This application is a divisional of, and claims the benefit of, co-pending, commonly assigned U.S. patent application Ser. No. 10/673,061, filed Sep. 26, 2003, which application is herein incorporated by reference in its entirety.

BACKGROUND OF THE INVENTION

Automated mail processing systems are known. However, presently-available fully-automated mail processing systems are limited in their ability to process all types of mail a recipient might receive. Thus, mail drops are often segmented during processing into groups having common attributes with respect to processing.

Because of the sheer volume of mail processed by some mail processors on behalf of multiple clients, process segments often become separated during processing, thus risking that a complete mail drop will not be fully processed at roughly the same time, an important criteria in many circumstances. Further, client expectations or service level agreements are not necessarily the same for all clients and are not inherent to the process. As a result, performance criteria for a particular mail drop is not usually evident to those processing the mail drop or may become lost as segments of the mail drop travel through the process. Thus, systems and methods are needed to improve the ability to fully process mail drops that may be segmented during processing.

BRIEF SUMMARY OF THE INVENTION

Embodiments of the present invention thus provide a mail processing system having a plurality of trays that are each adapted to hold a plurality of mail items. The mail items in a tray are directed to a common recipient. The system also includes a plurality of mail processing machines that are adapted to process the mail items. The different mail items may take different processing paths through the plurality of mail processing machines. The system also includes a tray tag generator that is configured to produce tray tags. Each of the plurality of trays is associated with a tray tag and each tray tag includes recipient information identifying processing requirements relating to the recipient of the mail items in the tray associated with the tray tag. The mail processing system may include readers configured to read information from the tray tags. The readers may comprise bar code readers and/or emissive tag readers.

In other embodiments, a mail processing system includes a plurality of trays that are each adapted to hold a plurality of mail items. The mail items in a tray are directed to a common recipient. The system also includes a plurality of mail processing machines that are adapted to process the mail items. The different mail items may take different processing paths through the plurality of mail processing machines. The system also includes a plurality of tray tags. Each tray is associated with a tray tag that includes recipient information identifying processing requirements relating to the recipient of the mail items in the tray associated with the tray tag. The system also includes a process management system that is configured to receive processing status information relating to the trays and output the information upon request. The mail processing system may include at least one reader configured to obtain the process status information by reading information from tray tags. The reader may be a bar code reader and/or an emissive tag reader, in which case the tag may emit information.

In still other embodiments, a mail processing system includes at least one mail processing machine and a computing device. Software programs the computing device to receive information relating to the status of a specific process segment of a tray of mail items and display the status of the specific process segment of the tray of mail items with respect to the mail processing machine. The system also includes a tray tag associated with each process segment of a mail drop. The tray tag includes recipient information identifying processing requirements relating to a recipient of the mail items in the process segment. The mail processing may include at least one reader configured to obtain process status information from the tray tag associated with each process segment in a mail drop. The reader may be a bar code reader. The tray tag be an emissive tag, in which case the reader may be an emissive tag reader.

In still other embodiments, a method of processing mail items includes receiving a mail drop comprising a plurality of trays of mail items. Each tray contains mail items for a common recipient. The method also includes associating each tray with a tray tag. Each tray tag includes recipient information identifying processing requirements relating to the recipient. The method also includes segmenting the mail into a plurality of process segments depending upon certain characteristics of the mail items and processing each of the plurality of process segments through different processes such that each process segment has a status with respect to its process. The method also includes using the tray tag to periodically update at least one process segment's status information in a process management system. The at least one process segment is from a particular tray. The method also includes using the status information of the at least one process segment to manage the processing of a different process segment from the particular tray. The tray tag may be a bar code for scanning the recipient information from the tray ticket. Each mail item may include a remittance to the recipient. The mail may be processed by a processor for the recipient according to particular processing standards. The processor may receive compensation from the recipient based on the processor's performance with respect to the standard. The tray tags may include information that identifies the processing standards for the recipient relating to the tray. The process management system may include a computing device and software that programs the computing device to receive information relating to the status of a specific process segment from a tray and display information relating to the status of the specific process segment from the tray in response to a request from a user.

In other embodiments, a method of processing mail items includes receiving a mail drop comprising a plurality of trays of mail items and associating each tray with a tray tag that includes recipient information identifying processing requirements relating to a recipient of the mail items in the tray associated with the tray tag. The method also may include processing the mail items through a plurality of processing steps and periodically using the tray tags to update the status of trays with respect to the processing steps in a processing management system. Periodically using the tray tags to update the status of trays with respect to the processing steps in a processing management system may include reading information from the tray tags using a bar code reader and/or reading information from the tray tags using an emissive tag reader.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

According to the present invention, a mail processor employs a tracking card in combination with an information system to efficiently process mail items. The mail processing system may apply to many different mail processing situations; however, it is particularly useful in situations wherein mail processors contract their services to clients in exchange for compensation that is based, at least in part, on the processor's efficiency. Thus, by way of example and not limitation, the following discussion will describe a mail processor that processes "remittances" from payers on behalf of clients (e.g., customers of the processor who have received a remittance from a payer. Also referred to herein as "recipient"). Clients may be virtually any entity that receives a payment from a processor. Examples include, utilities, credit card companies, banks, and the like. A remittance is a mail item that may include a payment, generally a check or money order, a payment stub, and the like. Although these items are typical, remittances also may include cash, change of address forms, correspondence from the payer, and the like.

In this example, the processor and the client negotiate service level agreements to which the processor must perform. Typically these service level agreements result in the processor needing to process mail drops in a first-in-first-out (FIFO) manner for maximum efficiency. The client desires to have all mail items processed efficiently to ensure that the payers' accounts are properly credited with having made the payment, the clients' deposit accounts receive the funds as soon as possible, and any customer service-related matters in the mail items are quickly resolved. Thus, the client and the processor generally attempt to negotiate service level agreements (which may be process standards or client requirements) that satisfy their mutual objectives. The present invention assists in meeting the service level agreements.

Figure 1:
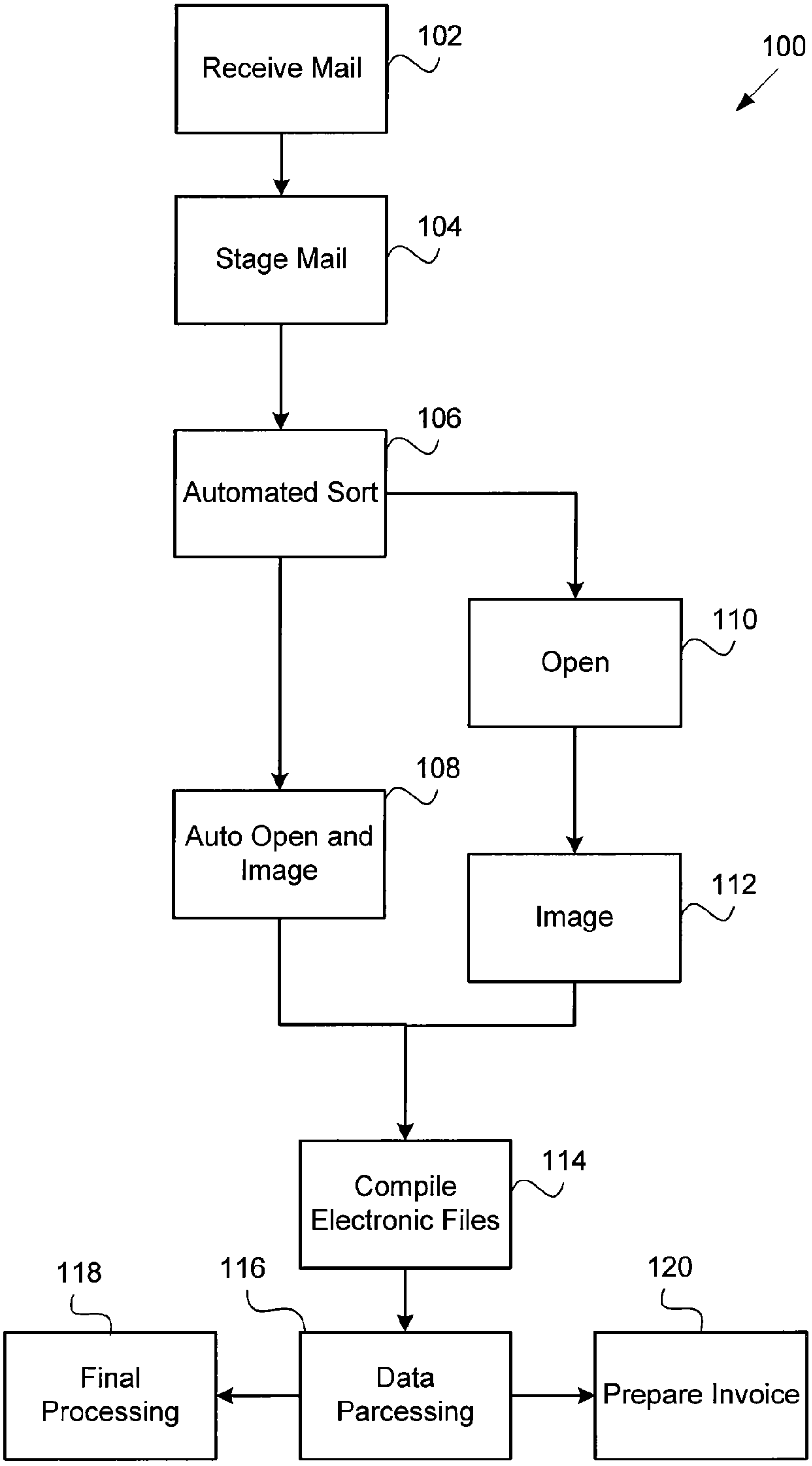
FIG. 1 illustrates a method of mail processing according to embodiments of the present invention.

According to the present invention, inbound mail items are received by the processor as a "mail drop" and staged for processing. Staging includes dividing the items into manageable groups. In this example, the groups are placed into mail processing trays. Herein "tray" will be understood to apply broadly to any type of mail container. Information about the mail drop is entered into a processing information system, which information is then used to create a tracking card, or "tray tag." If the mail items in the tray are later segmented, for example, because their attributes requires different processing paths, then a duplicate tray tag is placed with each segment. Periodically, information is entered into the processing information system to update the status of each processing segment in a mail drop. Thus, users may query the processing information system to determine the status of all items in a drop, while the tray tags may be used to visually locate particular segments and insert them into the production process efficiently. FIG. 1 illustrates one example of mail processing, to which the present invention may be applied.

FIG. 1 illustrates a method 100 of processing mail. The exemplary method 100 of FIG. 1 relates to remittance processing, although the present invention is not limited to remittance processing. In this particular example, the process begins with the receipt of mail at block 102. As previously mentioned, a mail drop comprises many mail items, often several thousand, and mail processors routinely receive numerous mail drops a day. The mail items typically are sorted into mail trays according to client, and a single mail drop may include mail for many clients. In the case of remittance processing, a large majority of the mail items include only a payment stub and a check. However, some customers include additional items or otherwise tender their remittance in such a way that automated processing of the remittance is difficult or impossible. For example, some customers staple their check to the payment stub, some include cash or coins, some include correspondence in addition to their payment stub and check, some use different envelopes than those provided by the client, some do not include the payment stub, and the like. Thus, a mail tray may include mail items capable of automated processing as well as mail items that require at least some manual processing.

At block 104, the mail drop is staged for processing. This may include further sorting the mail items, counting the mail items, logging the mail items, and the like. This also may include recording the date and time that the mail was received, which may be used to establish fees charged by the processor to the client. May other examples are possible.

At block 106, the mail is sorted through an automated process. Automated sorting may include segmenting the mail items into processing segments. Each processing segment typically includes similar mail items according to each item's ability to be processed automatically. Some items that include only a payment stub and check may be processed completely automatically. Other items, for example, whose contents are stapled together, must be processed, at least in part, manually. Thus, the mail items are sorted into process segments at block 106 using, in a specific embodiment, an MPS30 mail sorting machine. Process segments capable of automated processing (segment A) are directed to block 108, while process segments that must be partly manually processed (segment B) are directed to block 110. Although only two process segments will be used in the following discussion, it should be understood that any given tray may be segmented into any number of process segments.

At block 108, the segment A mail items are opened and imaged. Additionally, scan line information from each payment stub and MICR line information from each check is read into an electronic file. In one specific embodiment, the operations of block 108 are accomplished using an OPEX 150/IEM mail opening machine.

At block 110, the segment B mail items are opened. The operation of block 110 may take place with the assistance of an OPEX 50/51 mail opening machine. Recalling that the segment B mail items are not capable of fully automated processing, the operations of block 110 may involve manual steps. For example, it may be necessary for an operator to manually remove items from the envelopes, remove staples, review and/or document enclosed correspondence, and the like. It also may be necessary for an operator to appropriately sort and otherwise stage the payment stubs and check for further processing.

At block 112 the segment B items are imaged and the scan line information from each payment stub and MICR line information from each check is read into an electronic file. The operations of this block may be accomplished using, for example, a Unisys DP500 image capture device.

At block 114, the electronic files containing the images, payment stub scan line information, and MICR line information proceed to a computing device for further processing. It should be noted that at this stage in the process, the various process segments from a particular tray may be vastly separated from one another in both time and space. Many other process segments from other mail trays and even other mail drops may be queued for the processing that takes place from this operation forward. However, many mail processors are compensated by clients based on the processing time of entire mail drops, not individual segments. Thus, in some cases, all mail items in a drop must be completely processed before any mail items in the drop are credited with having been processed. As a result, it becomes important for processors to more carefully manage the processing of the slowest process segments, usually those such as segment B, which are not capable of completely automated processing.

At block 116, the process segments begin data processing, which may include verifying payment amounts, preparing postings, resolving discrepancies, and many other tasks necessary to credit payers with having made payments and post payments to client accounts. Data processing may involve electronically reading the amount tendered by the payer, comparing the amount tendered to the minimum payment and/or balance due, manually verifying the amount if these numbers do not match, and the like.

At block 118, posting reports are sent to clients, and checks are dispatched for deposit. Also at this block correspondence issues, such as address changes and the like, are handled according to client expectations.

At block 120, an invoice is prepared for each client detailing the charges from the processor for processing the client's mail. As mentioned previously, the charges may be based on the processor's ability to process the items according to pre-established standards. If any mail items were delayed in processing, the processor may lose money. For this reason, the processor desires to ensure that each mail item is processed according to these standards.

Figure 2:
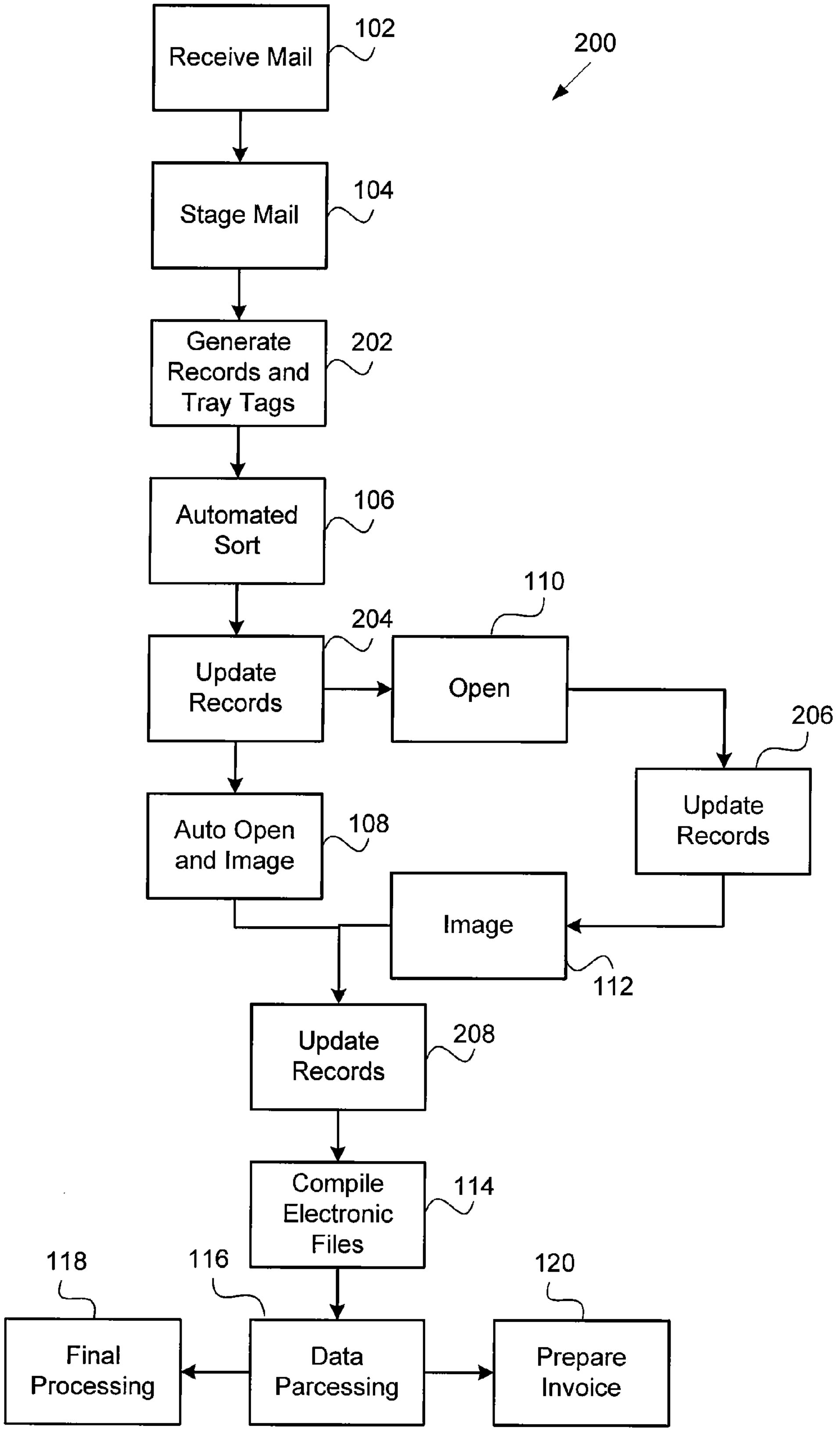
FIG. 2 illustrates a method of mail processing according to embodiments of the present invention which method includes the use of a processing management system.

Attention is now directed to FIG. 2 which illustrates a method 200 of processing mail according to the present invention. The method 200 includes many of the same operations discussed previously with respect to FIG. 1. However, the method 200 also includes operations relating to managing the flow of process segments through the entire process. To do so, the present invention employs a system according to embodiments of the present invention, as will be described.

At block 202, a user generates one or more records having information relating to a mail drop. The records may be created using a computing device running a database management application, for example. In such embodiments, the database management application also may access information relating to processing standards for the client. In some embodiments, a different record is created for each mail tray in a mail drop. In other examples, a single record is created for each client set in a mail drop. Other examples are possible.

Figure 3:
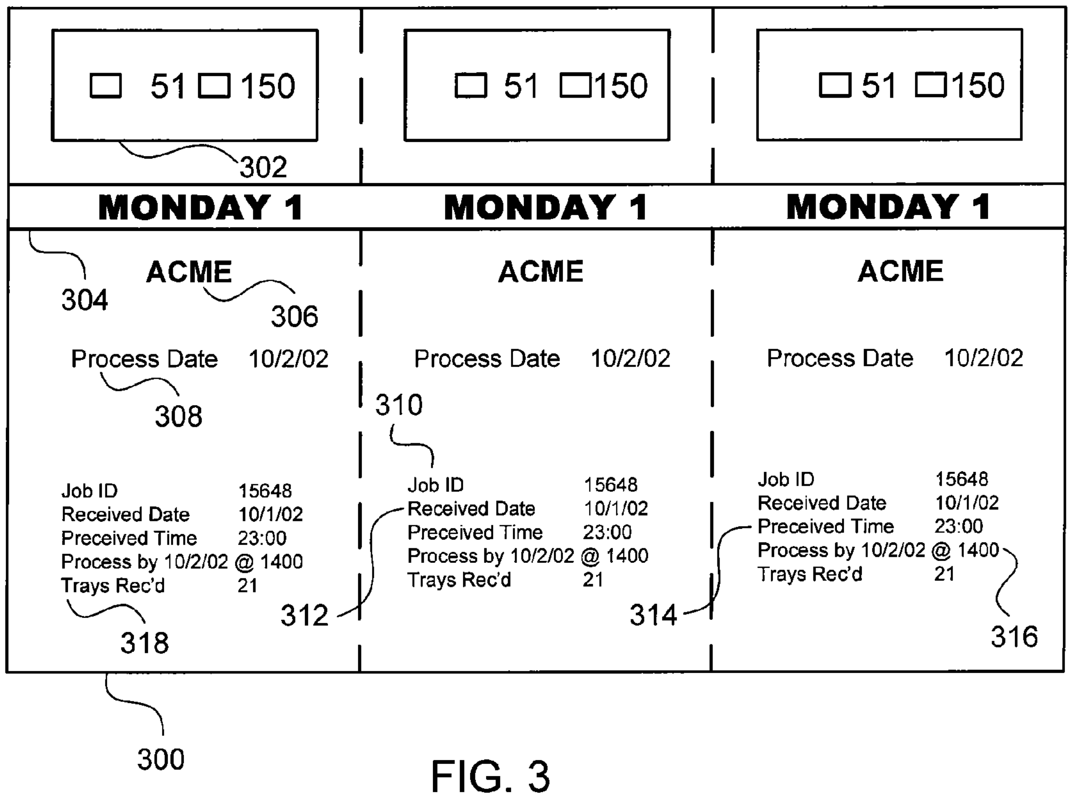
FIG. 3 illustrates an exemplary tray tag according to embodiments of the present invention.

Also at operation 202, a tray tag is printed that includes information relating to the items in the tray. A tray tag 300 according to embodiments of the invention is illustrated in FIG. 3. In most cases, all mail items in a tray are for a common client with similar processing attributes, criteria and processing deadlines. Thus, a tray tag need only list one customer. The content of a tray tag according to one embodiment of the present invention is described in more detail below.

Referring to FIG. 3, a tray tag 300, according to one example of the present invention, includes a machine identifier 302, a sequence field 304, a customer name field 306, a process date field 308, a job ID field 310, a receive date field 312, a receive time field 314, a process by date and time field 316, and a trays received field 318. Tray tags also may be color coded for easy identification. The machine identifier field 302 indicates which path a process segment takes through mail processing. It may be the case that the machine identifier 302 cannot be determined when the tray tag 300 is first created. For example, in this case, the tray tag 300 has blocks to check for both OPEX 51 and OPEX 150, corresponding to the OPEX 150/IEM and the OPEX 51 mail opening machine. Which path a particular segment takes through mail processing cannot be determined until after the MPS30 sorts the mail. Thus, at this point in the operation, the machine identifier 302 is not completed.

The sequence field 304 indicates the sequence in which the mail should be processed. Typically, processors process mail in a first-in-first-out sequence. Thus, as mail drops come in, each drop is sequenced, and the sequence field serves to identify the order in which a tray should be processed.

The customer name filed 306 identifies the client for whom the processor is processing the mail in a particular tray. The process date field 308, job ID field 310, receive date field 312, and receive time field 314 each include the information indicated by their titles. The process by date and time field 316 identifies the date by which a mail drop for a particular customer must be complete. This information may be derived from the processing standards to which the processor commits when contracting with a client. This information may be obtained automatically from information stored in the computing device running the mail processing database application. The trays received field 318 indicates the number of trays in a mail drop for a customer. Some of the tray tag information will be explained in more detail below.

The tray tags also may include identifiers that are unique to each tray or process segment. This makes it possible to not only track the status of a mail drop but to also track the individual status of each tray that makes up a mail drop.

Returning to FIG. 2 in conjunction with FIG. 3, it should be noted that the number of process segments a mail tray ultimately will generate is not necessarily known at operation 202. Thus, an initial tray tag may include multiple parts, and each part may include the same information. The reason for printing multiple tray tags for a single tray having the same information will become clear hereinafter. Also at operation 202, the tray tags are placed in the corresponding trays.

Continuing with the discussion of FIG. 2, at block 204, the records relating to a tray are updated. Updating the records may include simply accessing them via the computing device and indicating that the job number has been processed through the MPS30. At this point in the process, the mail has been sorted into two or more process segments, some of which can be processed automatically, and some of which require some manual processing. In some examples, each process segment is placed in a different tray and sent to the next appropriate processing area. Also at block 204 a tray tag is prepared for each process segment. This simply may involve separating a tray tag from the original set for each process segment and placing one in each tray. At this point the machine identifier 302 (FIG. 3) may be completed.

At block 206 records are updated to indicate that the segment B mail items have been processed through the 50/51. Similarly, at block 208, the record or records for a particular tray may be updated to indicate that the segment is ready for data processing (i. e., open and imaged). It should be noted that that records updating may take place at any point in the process, not necessarily at the places indicated in this example. Further, in other examples of the present invention, the process flow may be different, thus requiring a different arrangement of the records generation and updating process than that described in this example. Thus, it should be understood that many different examples of the present invention are possible.

It should also be noted at this point that a user may at any time access the records to determine the status of different process segments in a mail drop to determine if one is lagging in the process. Thus, the process flow described with respect to FIG. 2 generally relates to compiling information relating to the status of the process segments. Once the information is compiled and available, it may be used in any number of ways according to the present invention.

The entering of information relating to the tray tags and process segments may be accomplished in many different ways. In one example, the tray tags contain bar codes that are scanned in know ways each time a process segment completes a step in the processing cycle. The bar code readers may be wireless devices that transmit information to a central location, or they may be wired to computing devices that are networked together and/or that transmit information to a central location. Many other examples are possible.

In some embodiments, the tray tags may contain emissive tags that emit signals, such as radio frequency (RF), microwave, or the like. These signals may be unique to the trays or process segments. The production facility, in these examples, is equipped with readers that receive the signals. Thus, the location of any particular tray in the production environment may be known and continuously updated, thereby potentially negating the need for the steps of manually updating the records. In still other embodiments, the production environment doorways and/or work areas may be equipped with readers that detect when trays are moved through the doorway or work area to another area in the production environment. Many other examples are possible.

Figure 4:
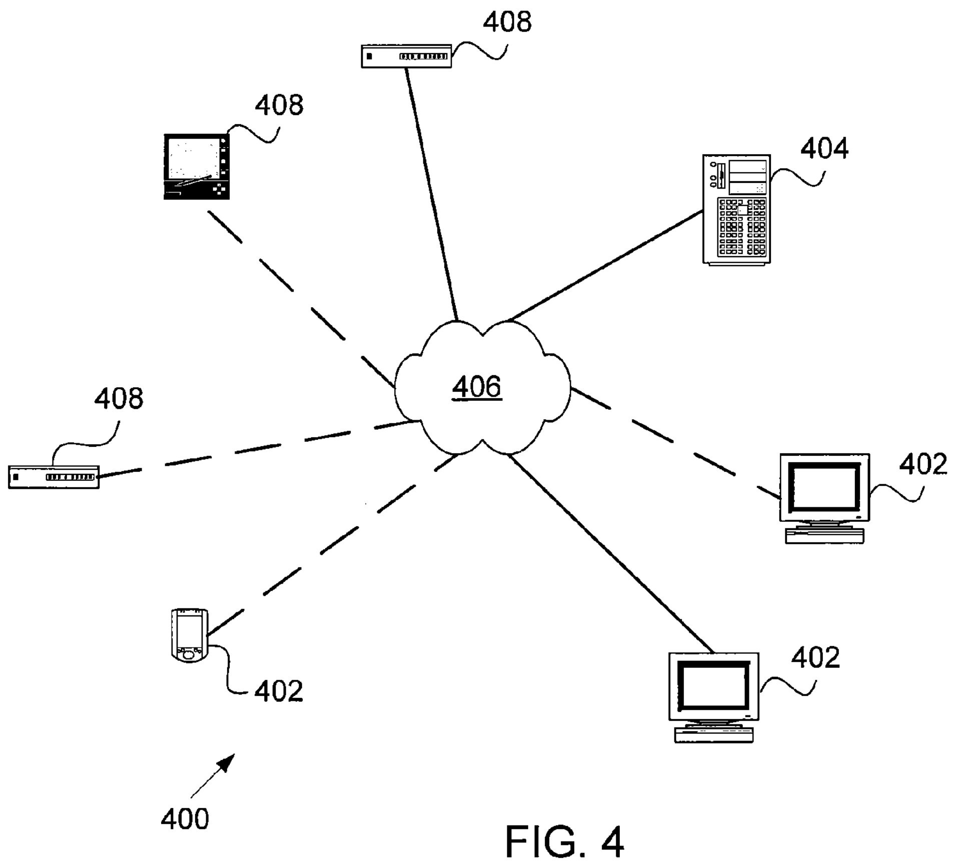
FIG. 4 illustrates a mail processing system according to embodiments of the present invention.

Attention is directed to FIG. 4, which illustrates one example of a processing information system according to embodiments of the present invention. As stated previously, a processing system may comprise a single computing device having a database management application configured to perform the functions of the present invention. In other embodiments, the processing system may comprise a number of networked computing devices, bar code readers, emitter device readers, access terminals, and the like distributed throughout a production environment. Further, one or more computing devices may be integral with pieces of mail processing equipment. Many other examples are possible, FIG. 4 illustrating but 1.

The processing information system 400 includes a number of computing devices 402, a server computer 404, and a network 406 through with the devices communicate. The computing devices 400 may be any types of suitable computing devices including personal computers, laptop computers, servers, desk top computers, workstations, personal digital assistants (PDAs), and the like. The server computer 404 also may be any of the aforementioned computing devices. The server computer 404 or one of the computing devices 402 may store information about the processing standards for the clients for whom the processor processes mail. The network 406 may be the Internet, an intranet, a wide area network (WAN), a local area network (LAN), a virtual private network, any combination of the foregoing, or the like. The network 406 may include both wired and wireless connections, including optical links. Additional, the system 400 may include a number of readers 408 distributed throughout the production environment. The readers 408 may be bar code readers, RF readers, and/or the like. The readers 408 may be positioned in doorways, at production equipment, and/or the like. The readers 408 may be wired or wireless, and may communicate with one or more of the computing devices and/or directly with the server. Many other examples are possible.

The server computer 404 and the computing devices 402 include application software that programs them to perform the function of the present invention, as previously described. The application software may be, for example, a database application program or a customer software application tailored to the specific needs of the processor. FIG. 5A-5E illustrate a series of screen displays from an exemplary application. The screen displays may appear on a display associated with the server computer 404 and/or one of the computing devices 402.

Figure 5A:
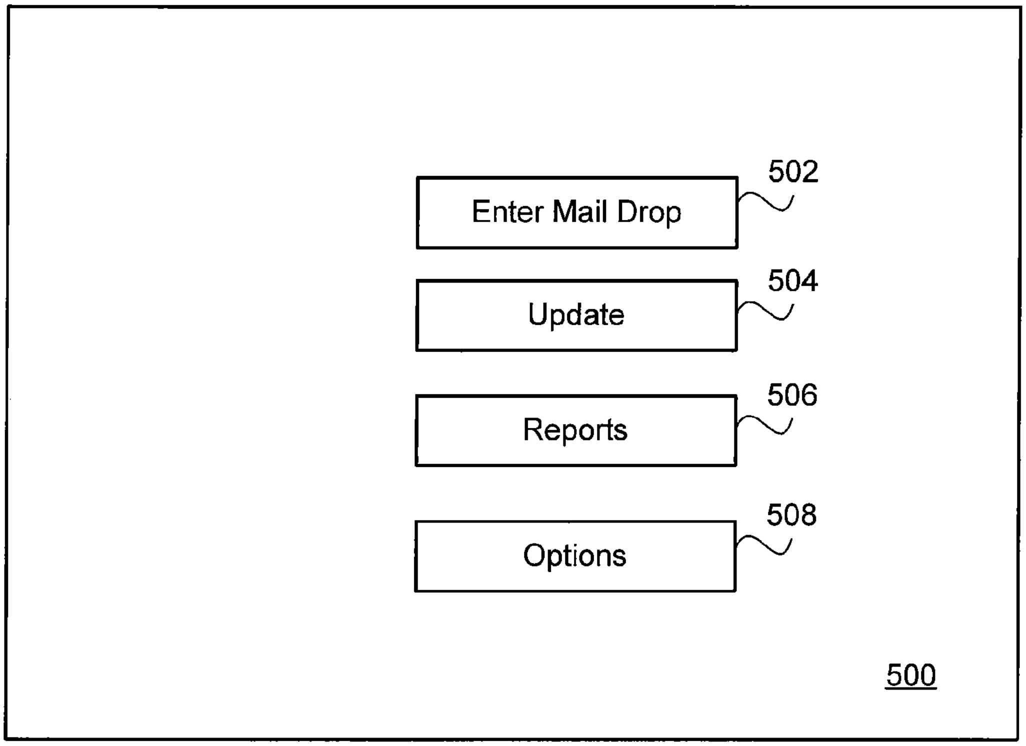
FIGS. 5A-5D illustrate a series of exemplary display screens in a processing management system according to embodiments of the present invention.

FIG. 5A illustrates a first screen display 500 for entering information about a mail drop. In some embodiments, the screen display 500 is the first screen a user encounters upon executing the application. In other examples, the screen display may be preceded by appropriate login and security screens that configure access levels and authorizations of users, as is known. The screen display 500 includes a menu of choices for the functions the user desires to perform. For example, a user at block 202 in the process of FIG. 2 may select the "Enter Mail Drop" button 502. A user at either of blocks 204, 206, or 208 might select the "Update" button 504. A user desiring to obtain the status of a process segment might select the "Reports" button 506. The "Options" button 508 may be used to configure the system.

Figure 5B:
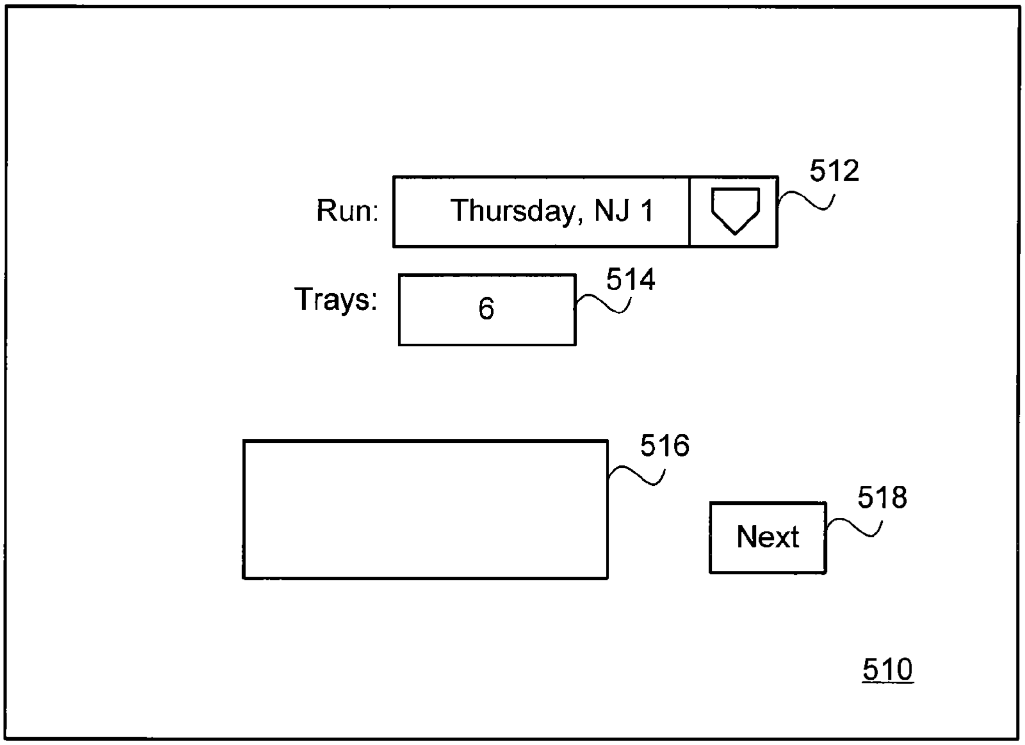

FIG. 5B illustrates a display screen 510 for entering information relating to a mail drop. A user may select which run the mail drop represents from a drop down menu 512. The user also may enter the number of trays in the run in the field 514. The user also may enter comments in the comment field 516. When the user has completed the appropriate information, the user may select the next button 518 to enter additional information.

Figure 5C:
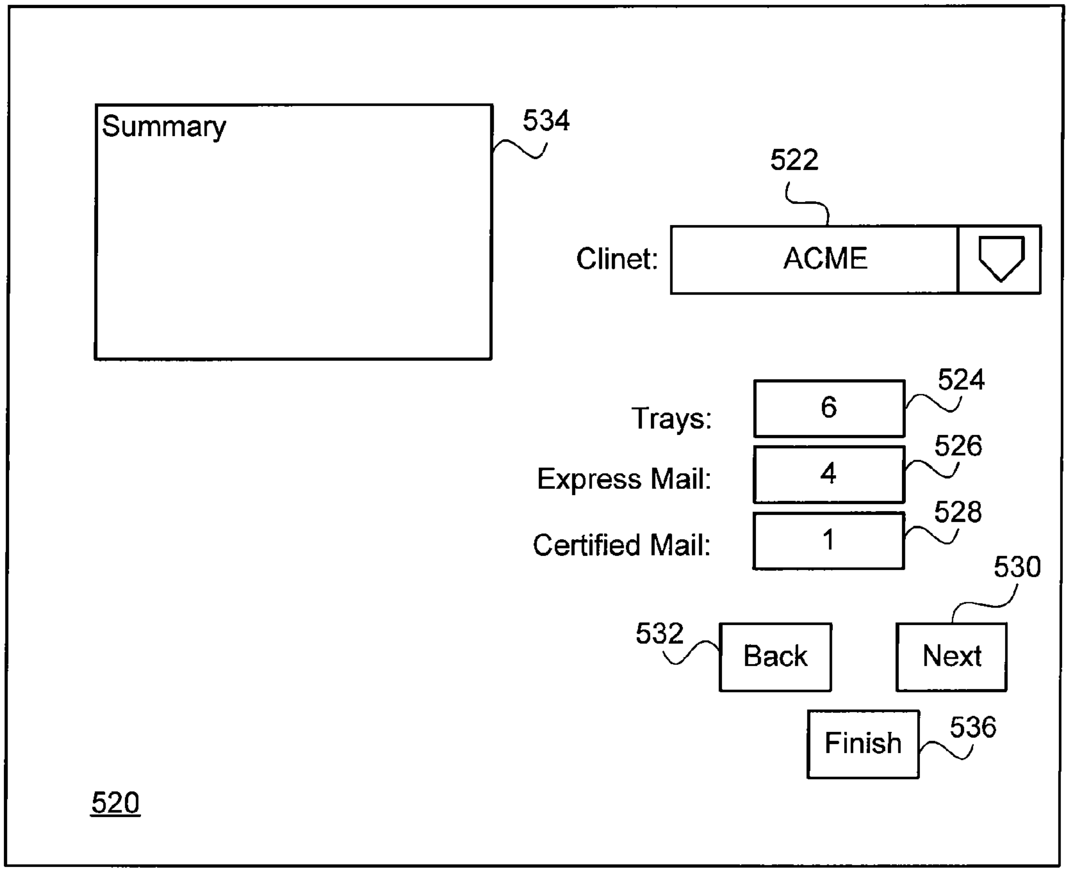

FIG. 5C illustrates a display screen 520 for entering additional information about a mail drop. The display screen 520 includes a client selection drop down menu 522, which allows a user to select a client from the list. Once the client is selected, the user may enter the number of trays in the tray field 524, enter the number of express mail pieces in the express mail field 526, and enter the number of certified mail pieces in the certified mail pieces field 528. The user may enter additional clients by selecting the next button 530 and select the back button 532 to correct previously-entered information. The information entered by the user shows up in the summary field 534. Once all the information is properly entered, the user may select the finish button 536 to enter the information. Selecting the finish button 536 also may print tray tags for the mail drop. Thus, as previously mentioned, the process of entering mail drop information may take place at block 202 of FIG. 2.

Figure 5D:
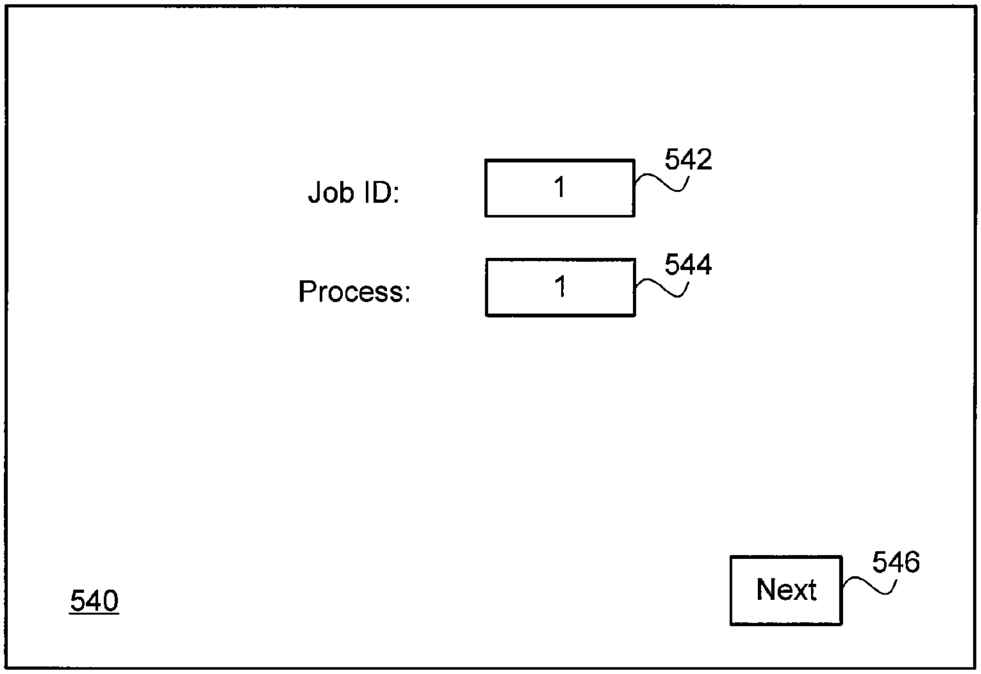

FIG. 5D illustrates an update display screen 540, which may be accessed by a user at either of blocks 204, 206, and/or 208 of FIG. 2, for example. Using the update display screen 540, the user may enter the job ID number in the ID number field 542, and, in the process field 544, designate the machine in the process to which the update relates. Selecting the next button 546 may display a second update display screen for updating other information about the process. It should be noted that these display screens are merely examples of display screens that may be used to enter information to track the progress of process segments through mail processing. As the information is entered, records relating to the mail drops are updated, as previously described. At any time, a user may access the information in the records and manage mail processing accordingly.

Having described several embodiments, it will be recognized by those of skill in the art that various modifications, alternative constructions, and equivalents may be used without departing from the spirit of the invention. In general, embodiments of the present invention are applicable to any inbound time-sensitive process, including, for example, paper credit or any other kind of applications, bankruptcy notices, customer service requests, accounts receivable documents and payments, account fulfillment materials, and inventory for batch processing of statements, card products, and the like. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to mail processing. For example, the present invention may be used in other production environments, such as, for example, check processing, and the like. Accordingly, the above description should not be taken as limiting the scope of the invention, which is defined in the following claims.

What is claimed is:

1. A mail processing system, comprising:

at least one mail processing machine;

a computing device;

software that programs the computing device to:

receive information relating to the status of a specific process segment of a tray of mail items; and display the status of the specific process segment of the tray of mail items with respect to the mail processing machine; and a tray tag associated with each process segment of a mail drop, wherein the tray tag includes recipient information identifying processing requirements relating to a recipient of the mail items in the process segment, wherein the processing requirements comprise one of a process by date and a process by time;

wherein the mail is processed by a processor for the recipient according to the processing requirements and wherein the processor receives compensation from the recipient based on the processor's performance with respect to the requirements, the system further comprising a process management system programmed to track the processor's performance with respect to the requirements.

2. The mail processing system of claim 1, wherein the process management system comprises a computing device and software that programs the computing device to:

receive information relating to the status of a specific process segment from a tray; and display information relating to the status of the specific process segment from the tray in response to a request from a user.

3. A mail processing system, comprising:

at least one mail processing machine;

a computing device;

software that programs the computing device to:

receive information relating to the status of a specific process segment of a tray of mail items; and display the status of the specific process segment of the tray of mail items with respect to the mail processing machine; and a tray tag associated with each process segment of a mail drop, wherein the tray tag includes recipient information identifying processing requirements relating to a recipient of the mail items in the process segment;

wherein the mail is processed by a processor for the recipient according to the processing requirements and wherein the processor receives compensation from the recipient based on the processor's performance with respect to the requirements, the system further comprising a process management system programmed to track the processor's performance with respect to the requirements.

4. The mail processing system of claim 3, wherein the process management system comprises a computing device and software that programs the computing device to:

receive information relating to the status of a specific process segment from a tray; and display information relating to the status of the specific process segment from the tray in response to a request from a user.

* * * * *